(12) United States Patent
Kubo et al.

(10) Patent No.: US 11,498,420 B2
(45) Date of Patent: Nov. 15, 2022

(54) VEHICLE AND CONTROL METHOD THEREOF

(71) Applicant: TOYOTA JIDOSHA KABUSHIKI KAISHA, Toyota (JP)

(72) Inventors: Kazuki Kubo, Toyota (JP); Yoshihiro Uchida, Nagakute (JP); Junta Izumi, Nagoya (JP); Masaki Uchiyama, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 16/567,207

(22) Filed: Sep. 11, 2019

(65) Prior Publication Data

US 2020/0122577 A1 Apr. 23, 2020

(30) Foreign Application Priority Data

Oct. 19, 2018 (JP) .............................. JP2018-197632

(51) Int. Cl.
| | |
|---|---|
| *G06F 17/00* | (2019.01) |
| *B60K 35/00* | (2006.01) |
| *G07C 5/08* | (2006.01) |
| *B60L 58/16* | (2019.01) |
| *H01M 10/48* | (2006.01) |
| *B60K 6/28* | (2007.10) |
| *B60L 50/60* | (2019.01) |

(52) U.S. Cl.
CPC .............. *B60K 35/00* (2013.01); *B60L 58/16* (2019.02); *G07C 5/0825* (2013.01); *H01M 10/488* (2013.01); *B60K 6/28* (2013.01); *B60K 2370/52* (2019.05); *B60L 50/60* (2019.02); *B60Y 2200/91* (2013.01); *B60Y 2200/92* (2013.01); *B60Y 2400/112* (2013.01); *H01M 2220/20* (2013.01)

(58) Field of Classification Search
CPC ...... B60K 35/00; B60K 6/28; B60K 2370/52; B60K 2370/169; B60L 58/16; B60L 50/60; B60L 2240/54; B60L 2250/16; B60L 58/12; G07C 5/0825; H01M 10/488; H01M 2220/20; B60Y 2200/91; B60Y 2200/92; B60Y 2400/112; Y02E 60/10; Y02T 10/70
USPC ......................................................... 701/34
See application file for complete search history.

(56) References Cited

U.S. PATENT DOCUMENTS

| | | | | |
|---|---|---|---|---|
| 7,880,597 | B2* | 2/2011 | Uchida ................... | B60L 50/16 340/439 |
| 8,676,482 | B2* | 3/2014 | Uchida ................. | B60W 10/26 701/123 |

(Continued)

FOREIGN PATENT DOCUMENTS

| | | |
|---|---|---|
| CN | 102648104 A | 8/2012 |
| EP | 2 502 776 A1 | 9/2012 |

(Continued)

*Primary Examiner* — Ronnie M Mancho
(74) *Attorney, Agent, or Firm* — Sughrue Mion, PLLC (57) ABSTRACT

A vehicle includes a battery that is mounted as a power source in the vehicle and an instrument panel that displays, to a user of the vehicle, an index (a capacity retention ratio Q or an electric vehicle (EV) travelable distance) indicating a larger value as deterioration of the battery progresses less. The instrument panel displays a maximum value of the index until a predetermined condition has been satisfied.

9 Claims, 6 Drawing Sheets

(56) References Cited

U.S. PATENT DOCUMENTS

| | | | |
|---|---|---|---|
| 8,820,446 B2* | 9/2014 | Kusumi | B60L 58/12 320/134 |
| 2007/0029974 A1* | 2/2007 | Uchida | G01R 31/3842 320/132 |
| 2009/0040033 A1* | 2/2009 | Uchida | B60K 6/28 340/439 |
| 2010/0211240 A1* | 8/2010 | Crombez | B60W 10/184 903/903 |
| 2011/0066310 A1* | 3/2011 | Sakai | B60L 7/16 701/22 |
| 2013/0035813 A1* | 2/2013 | Kusumi | B60W 10/26 701/22 |
| 2018/0050601 A1* | 2/2018 | Katanoda | B60L 58/13 |

FOREIGN PATENT DOCUMENTS

| | | | |
|---|---|---|---|
| JP | 2007074891 A | | 3/2007 |
| JP | 2007274806 A | | 10/2007 |
| JP | 2008206301 A | * | 9/2008 |
| JP | 2016215836 A | | 12/2016 |
| JP | 2018-029430 A | | 2/2018 |

* cited by examiner

VEHICLE AND CONTROL METHOD THEREOF

INCORPORATION BY REFERENCE

The disclosure of Japanese Patent Application No. 2018-197632 filed on Oct. 19, 2018 including the specification, drawings and abstract is incorporated herein by reference in its entirety.

BACKGROUND

1. Technical Field

The present disclosure relates to a vehicle and a control method thereof and more particularly to a vehicle in which a secondary battery is mounted as a power source and a control method thereof.

2. Description of Related Art

A secondary battery is mounted as a drive source (a power source) of a motor in vehicles such as a hybrid vehicle and an electric vehicle. It is known that a secondary battery deteriorates and the internal resistance of the secondary battery increases or a full charging capacity of the secondary battery decreases with the elapse of time. Accordingly, various techniques for estimating a deterioration state of a secondary battery have been proposed. For example, Japanese Unexamined Patent Application Publication No. 2018-29430 (JP 2018-29430 A) discloses a technique for enhancing the estimation accuracy of a deterioration state of a secondary battery.

SUMMARY

When a full charging capacity of a secondary battery decreases, a distance over which a vehicle can travel with the electric power stored in a secondary battery (a so-called electric vehicle (EV) travelable distance) decreases. When a full charging capacity of a secondary battery decreases, an amount of electric power which can be recovered by regenerative control during travel decreases and thus there is a likelihood that a decrease in power efficiency of an electric vehicle or a decrease in fuel efficiency of a hybrid vehicle or a plug-in hybrid vehicle will be caused. Accordingly, the value of a vehicle decreases as a fully charging capacity of a secondary battery decreases. As a result, a deterioration state of a secondary battery can be said to be a user's major concern.

In consideration of the above-mentioned circumstances, it is conceivable that an index indicating a deterioration state of a secondary battery be displayed on a display system (such as an instrument panel). A specific display method includes displaying a capacity retention ratio of a secondary battery as a numerical value (percentage), displaying a number of icons corresponding to the capacity retention ratio, or the like. Alternatively, an EV travelable distance of a vehicle may be displayed as the index. Here, a capacity retention ratio refers to a ratio of a full charging capacity of a secondary battery at a current time (after having deteriorated) to a full charging capacity (typically, a catalog value) of the secondary battery at the time of manufacturing of the vehicle.

The inventors have noticed that the following problems will be able to occur when a user is notified of a deterioration state of a secondary battery by displaying the index. When a user purchases a new vehicle, a certain period (for example, several weeks to several months) may pass until the vehicle is delivered to the user after the vehicle has been manufactured. In general, a new secondary battery is mounted in a vehicle at the time of manufacturing the vehicle, and deterioration of the secondary battery progresses continuously from the time at which the secondary battery has been manufactured. Immediately after a secondary battery has been manufactured, a rate of progress of deterioration of the secondary battery is particularly high. Accordingly, at a time point at which a vehicle is delivered to a user, there is a likelihood that a capacity retention ratio of a secondary battery (or an EV travelable distance) will be less than the capacity retention ratio (=100%) at the time of manufacturing the vehicle. Then, a user may feel a sense of incompatibility because a new vehicle has been purchased but a secondary battery has deteriorated from an initial time (at a time point at which the vehicle has been delivered to the user).

The present disclosure is for decreasing a sense of incompatibility which is felt by a user who has purchased a new vehicle.

(1) According to a first aspect of the present disclosure, there is provided a vehicle including: a secondary battery that is mounted as a power source in the vehicle; and a display device configured to display, to a user of the vehicle, an index indicating a larger value as deterioration of the secondary battery progresses less. The display device displays a maximum value of the index until a predetermined condition has been satisfied.

(2) According to a second aspect of the present disclosure, there is provided a vehicle including: a secondary battery that is mounted as a power source in the vehicle; and a display device configured to display, to a user of the vehicle, an index indicating a smaller value as deterioration of the secondary battery progresses less. The display device displays a minimum value of the index until a predetermined condition has been satisfied.

(3) The predetermined condition may be satisfied when a total travel distance of the vehicle has reached a predetermined distance. (4) The predetermined condition may be satisfied when the vehicle is delivered to the user.

Even when time has elapsed after a vehicle has been manufactured, an index indicating that deterioration of the secondary battery has not progressed may be displayed on the display device until the predetermined condition has been satisfied. Accordingly, it is possible to decrease a sense of incompatibility which is felt by a user because a new vehicle has been purchased but the secondary battery has deteriorated.

(5) The index may be at least one of a capacity retention ratio of the secondary battery and a travelable distance over which the vehicle is able to travel with electric power stored in the secondary battery.

There are users who are not familiar with deterioration of a secondary battery, but a capacity retention ratio or a travelable distance is an index which can be easily understood by many users. Accordingly, it is possible to decrease a sense of incompatibility which is felt by many users.

(6) The vehicle may further include a control device configured to control the display device. The control device may be configured to receive a full charging capacity of the secondary battery from a device provided outside the vehicle when the vehicle is delivered to the user and to set a capacity retention ratio of the secondary battery corresponding to the received full charging capacity to 100%.

By using a full charging capacity which is measured by a device outside the vehicle (such as a dedicated inspection tool), it is possible to accurately measure a full charging capacity of a secondary battery and to estimate a deterioration state of the secondary battery from the actual full charging capacity of the secondary battery in the vehicle.

(7) According to a third aspect of the present disclosure, there is provided a method of controlling a vehicle in which a secondary battery is mounted as a power source. The method of controlling a vehicle includes: determining whether a predetermined condition has been satisfied; and causing a display device to display, to a user of the vehicle, a maximum value of an index indicating a larger value as deterioration of the secondary battery progresses less until the predetermined condition has been satisfied.

With the method of (7), it is possible to decrease a sense of incompatibility which is felt by a user similarly to the first aspect.

According to the present disclosure, it is possible to decrease a sense of incompatibility which is felt by a user who has purchased a new vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings. The same or similar elements in the drawings are referred to by the same reference signs and description thereof will not be repeated.

In embodiments described below, it is assumed that a vehicle according to the present disclosure is a plug-in hybrid vehicle having a configuration in which an onboard battery (a secondary battery) can be charged with electric power supplied from a charger (a charging facility) provided outside the vehicle. The vehicle according to the present disclosure may be a normal hybrid vehicle (which cannot be charged from the outside), an electric vehicle, or a fuel-cell vehicle as long as a battery serving as a power source is mounted in the vehicle.

First Embodiment

<Overall Configuration of System>

Figure 1:
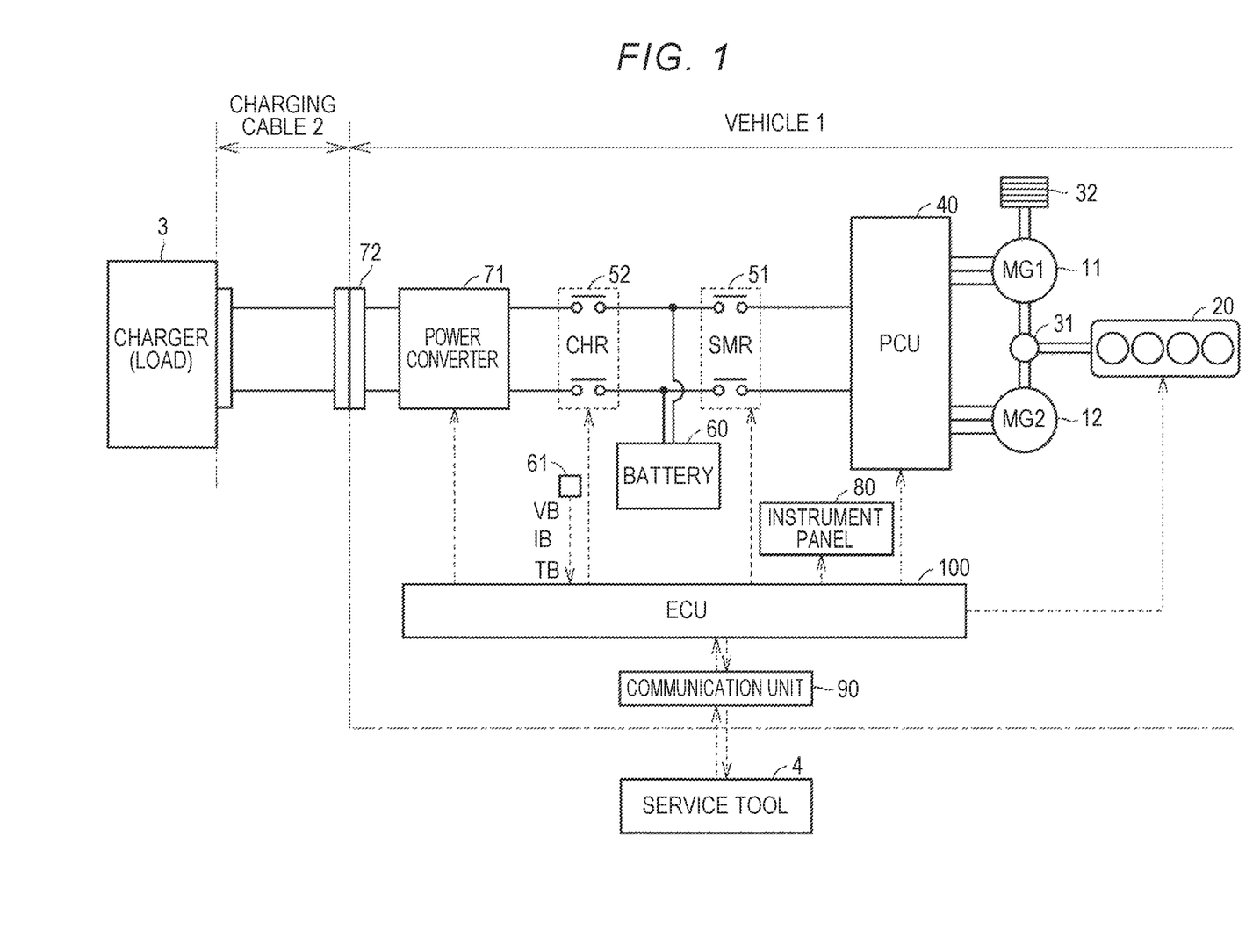
FIG. 1 is a diagram schematically illustrating an overall configuration of a system including a vehicle according to a first embodiment of the present disclosure.

FIG. 1 is a diagram schematically illustrating an overall configuration of a system including a vehicle according to a first embodiment of the present disclosure. Referring to FIG. 1, the vehicle 1 is configured to be able to be electrically connected to a charger 3 (which may be a load outside the vehicle) via a charging cable 2 and is configured to communicate with a service tool 4. The service tool 4 is a dedicated terminal which is installed in a dealer shop, a repair shop, or the like and is used to perform diagnosis of whether there is an abnormality (including a deterioration state of a battery) in the vehicle 1 or to set various parameters of the vehicle 1.

The vehicle 1 includes motor generators 11 and 12, an engine 20, a power splitter 31, a driving wheel 32, a power control unit (PCU) 40, a system main relay (SMR) 51, a charging relay 52, a battery 60, a monitoring unit 61, a power converter 71, an inlet 72, an instrument panel 80, a communication unit 90, and an electronic control unit (ECU) 100.

Each of the motor generators 11 and 12 is, for example, a three-phase alternating current (AC) rotary electric machine in which a permanent magnet is embedded in a rotor (not illustrated). The motor generator 11 is connected to a crank shaft of the engine 20 via the power splitter 31. The motor generator 11 rotates the crank shaft of the engine 20 using electric power of the battery 60 when the engine 20 is started. The motor generator 11 may generate electric power using the power of the engine 20. AC power which is generated by the motor generator 11 is converted into direct current (DC) power by the PCU 40 and is charged into the battery 60. AC power which is generated by the motor generator 11 may be supplied to the motor generator 12.

The motor generator 12 rotates a drive shaft using at least one of electric power from the battery 60 and electric power which is generated by the motor generator 11. The motor generator 12 can also generate electric power by regenerative braking. AC power which is generated by the motor generator 12 is converted into DC power by the PCU 40 and is charged into the battery 60.

The engine 20 is an internal combustion engine such as a gasoline engine or a diesel engine and generates power for allowing the vehicle 1 to travel in accordance with a control signal from the ECU 100.

The power splitter 31 is, for example, a planetary gear mechanism and splits power which is generated by the engine 20 into power which is transmitted to the driving wheel 32 and power which is transmitted to the motor generator 11.

The PCU 40 converts DC power stored in the battery 60 into AC power and supplies the AC power to the motor generators 11 and 12 in accordance with a control signal from the ECU 100. The PCU 40 converts AC power generated by the motor generators 11 and 12 into DC power and supplies the DC power to the battery 60.

The SMR 51 is electrically connected to a power line connecting the PCU 40 to the battery 60. The SMR 51 switches between supply and cutoff of electric power between the PCU 40 and the battery 60 in accordance with a control signal from the ECU 100.

The charging relay 52 is electrically connected to a power line connecting the battery 60 to the power converter 71. The charging relay 52 switches between supply and cutoff of electric power between the battery 60 and the power converter 71 in accordance with a control signal from the ECU 100.

The battery 60 is a DC power supply which is configured to be chargeable and dischargeable. A secondary battery such as a lithium-ion secondary battery or a nickel-hydride battery can be used as the battery 60. The battery 60 supplies electric power for generating a driving force of the vehicle 1 to the PCU 40. The battery 60 also stores electric power which is generated by the motor generator 11.

The monitoring unit 61 monitors a state of the battery 60. Specifically, the monitoring unit 61 includes a voltage sensor that detects a voltage VB of the battery 60, a current sensor that detects a current IB which is input to and output from the battery 60, and a temperature sensor that detects a temperature TB of the battery 60 (none of which are illustrated). The sensors output signals indicating results of detection to the ECU 100.

The power converter 71 includes, for example, an AC/DC converter (not illustrated) and serves to convert AC power which is supplied from the charger 3 via the charging cable 2 and the inlet 72 into DC power and to output the DC power to the charging relay 52.

The instrument panel 80 is a gauge board in which meters are installed and notifies a user of various states of the vehicle 1 under the control of the ECU 100.

The communication unit 90 is configured to perform interactional communication with the service tool 4 in a wired or wireless manner. The communication unit 90 may be configured to communicate with a server (not illustrated) which is provided outside the vehicle 1

The ECU 100 includes a central processing unit (CPU), a memory, and an input and output port (none of which are illustrated). The ECU 100 outputs control signals based on input of signals from various sensors and maps and programs stored in the memory, and controls the devices such that the vehicle 1 reaches a desired state. In this embodiment, an example of principal control which is executed by the ECU 100 is a "deterioration displaying process" of displaying an index indicating a deterioration state of the battery 60 on the instrument panel 80. Details of the deterioration displaying process will be described later.

The service tool 4 includes a CPU, a memory, and a buffer (none of which are not illustrated) similarly to the ECU 100. As described above, the service tool 4 serves to perform diagnosis of whether there is an abnormality in the vehicle 1 or to set various parameters of the vehicle 1 in accordance with an operator's operation in a dealer shop or the like.

In the vehicle 1 having the above-mentioned configuration, when a full charging capacity of the battery 60 decreases, a distance over which the vehicle 1 can travel (an electric vehicle (EV) travelable distance) decreases. When the full charging capacity of the battery 60 decreases, electric power which can be recovered by regenerative braking during travel decreases and there is a likelihood that a decrease in fuel efficiency of the vehicle 1 will be caused. Accordingly, the value of the vehicle 1 decreases as the full charging capacity of the battery 60 decreases. Accordingly, the deterioration state of the battery 60 can be said to be a major concern of a user of the vehicle 1. Accordingly, the instrument panel 80 is configured to display an index indicating the deterioration state of the battery 60.

Figure 2:
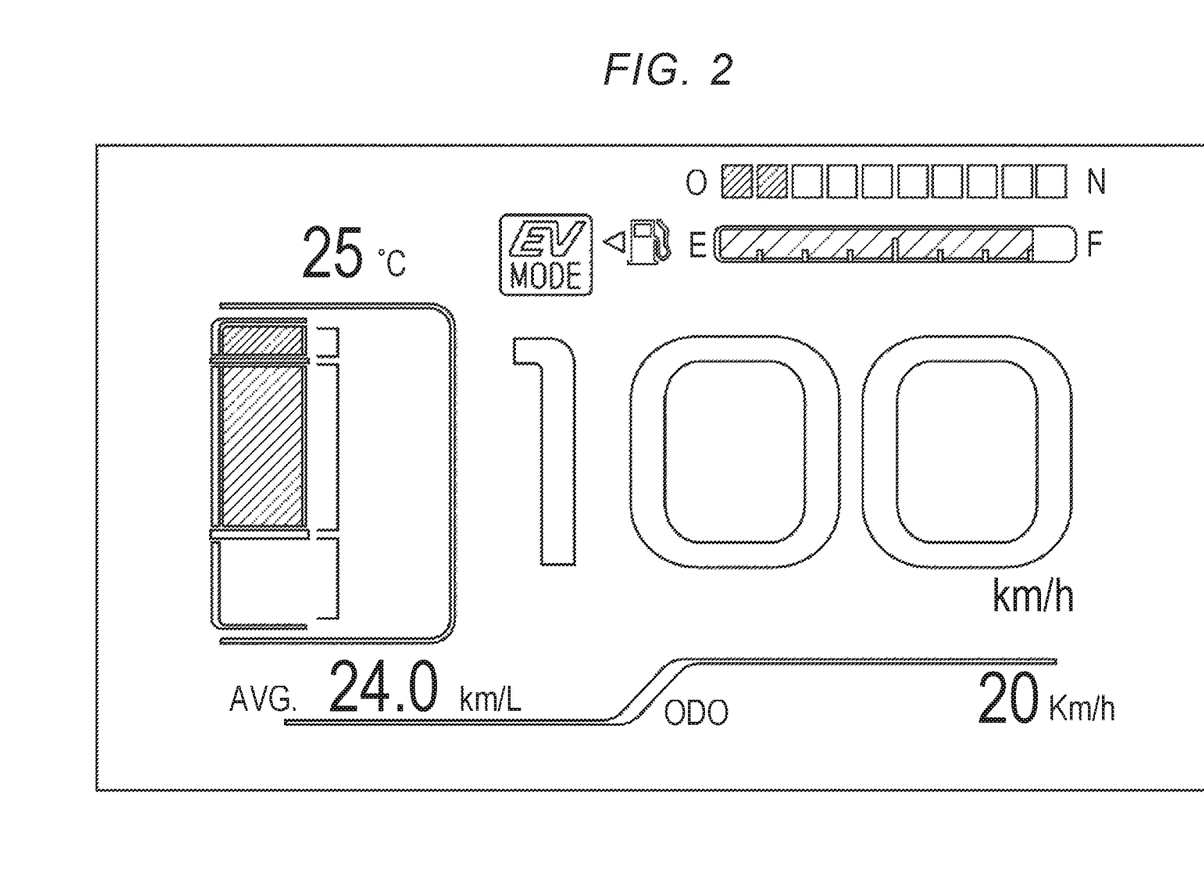
FIG. 2 is a diagram illustrating an example of a display mode of an instrument panel.

FIG. 2 is a diagram illustrating an example of a display mode of the instrument panel 80. As illustrated in FIG. 2, a speed (for example, 100 km/h), an average fuel efficiency (24.0 km/L), a travel distance (20 km), an outside air temperature (25° C.), an amount of residual fuel, and the like of the vehicle 1 are displayed on the instrument panel 80.

In addition to the above-mentioned parameters, the instrument panel 80 is configured to display the number of icons (a meter) corresponding to a capacity retention ratio of the battery 60 as illustrated in the right uppermost part of the drawing. In the example illustrated in FIG. 2, the number of icons in a state in which the battery 60 has not deteriorated is 10 and the number of icons decreases as deterioration of the battery 60 progresses. When the number of icons is equal to or less than two, it means that deterioration of the battery 60 has progressed considerably and replacement of the battery 60 should be considered.

Although not illustrated in the drawing, the instrument panel 80 may display the capacity retention ratio of the battery 60 as a numerical value (percentage). Alternatively, the instrument panel 80 may display an EV travelable distance of the vehicle 1 instead of the capacity retention ratio of the battery 60. The instrument panel 80 may display both the capacity retention ratio of the battery 60 and the EV travelable distance of the vehicle 1.

The instrument panel 80 may be considered to be a "display device" according to the present disclosure. However, the "display device" according to the present disclosure is not limited to the instrument panel 80 and may be a liquid crystal display (not illustrated) of a car navigation system.

<Temporal Change of Capacity Retention Ratio>

In general, a new battery is mounted in a vehicle at the time of manufacturing the vehicle, but deterioration of a battery thereof progresses continuously from the time of manufacturing the battery.

Figure 3:
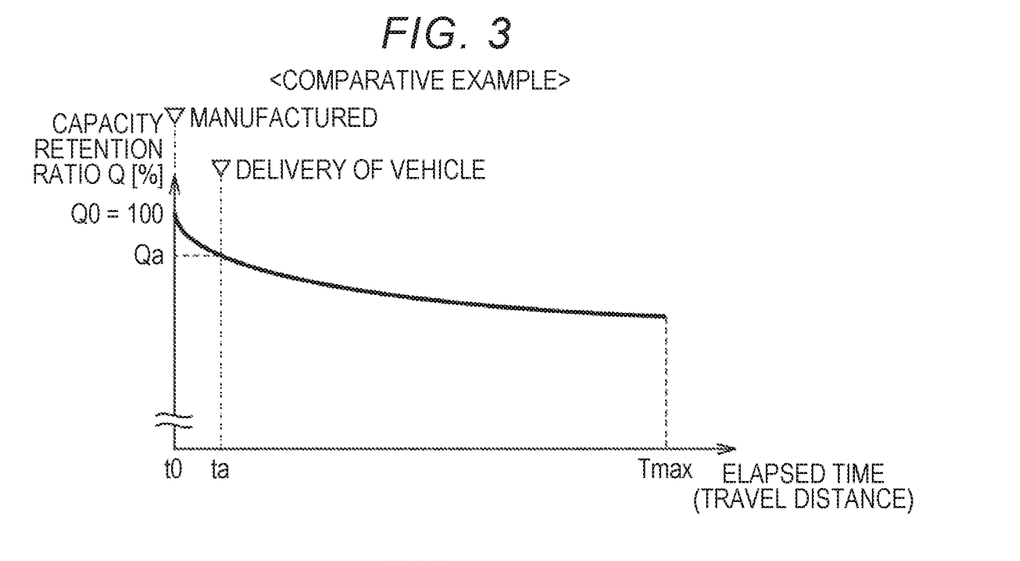
FIG. 3 is a diagram illustrating an example of a temporal change of a capacity retention ratio of a battery.

FIG. 3 is a diagram illustrating an example of a temporal change of the capacity retention ratio Q of the battery 60. In FIG. 3, the horizontal axis represents an elapsed time after the vehicle 1 has been manufactured (which is indicated by t0). Here, the horizontal axis may represents an elapsed time after the battery 60 has been manufactured. Alternatively, the horizontal axis may be replaced with a travel distance of the vehicle 1. The vertical axis represents the capacity retention ratio of the battery 60 (=full charging capacity of battery 60 at each time point/full charging capacity of battery 60 at the time of manufacturing vehicle 1).

As illustrated in FIG. 3, immediately after a battery has been manufactured, a rate of progress of deterioration of the battery is generally the highest. When a user purchases a new vehicle, a certain period (for example, several weeks to several months) may pass until the vehicle 1 is delivered to the user after the vehicle 1 has been manufactured. Accordingly, at a time point (time ta) at which the vehicle 1 is delivered to the user, there is a likelihood that the capacity retention ratio Qa of the battery 60 (or the travelable distance) will be less than the capacity retention ratio Q0=100% at the time of manufacturing the vehicle 1. Then, the user may feel a sense of incompatibility because the vehicle 1 has been purchased as a new vehicle but a battery 60 has deteriorated at the time point at which the vehicle has been delivered to the user.

Therefore, in the first embodiment, a configuration in which display of the instrument panel 80 is controlled such that the capacity retention ratio of the battery 60 at a time point at which the vehicle 1 has been delivered to the user is not less than 100% may be employed as described below.

Figure 4:
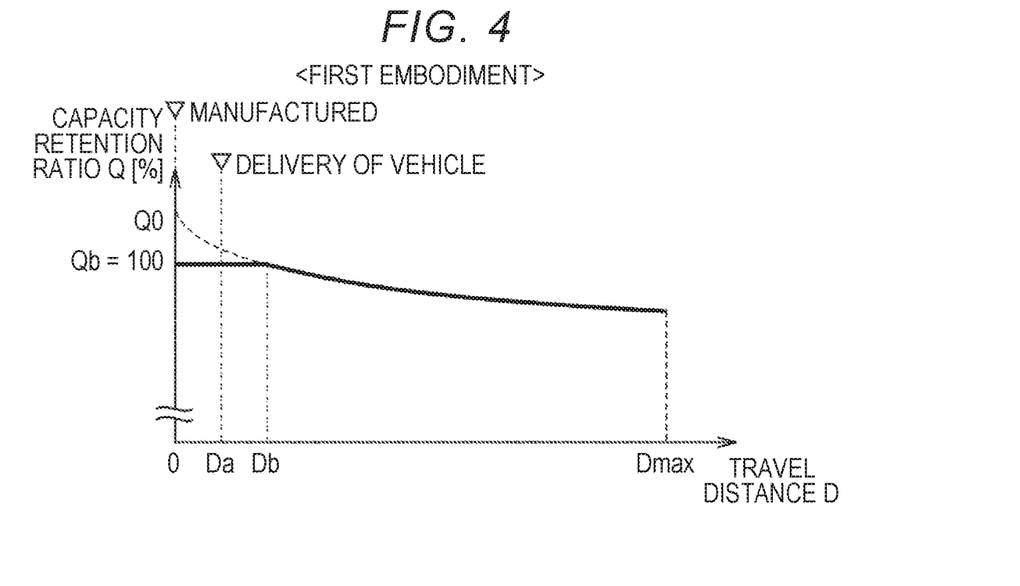
FIG. 4 is a diagram illustrating an example in which a capacity retention ratio of a battery is displayed according to a first embodiment.
Figure 6:
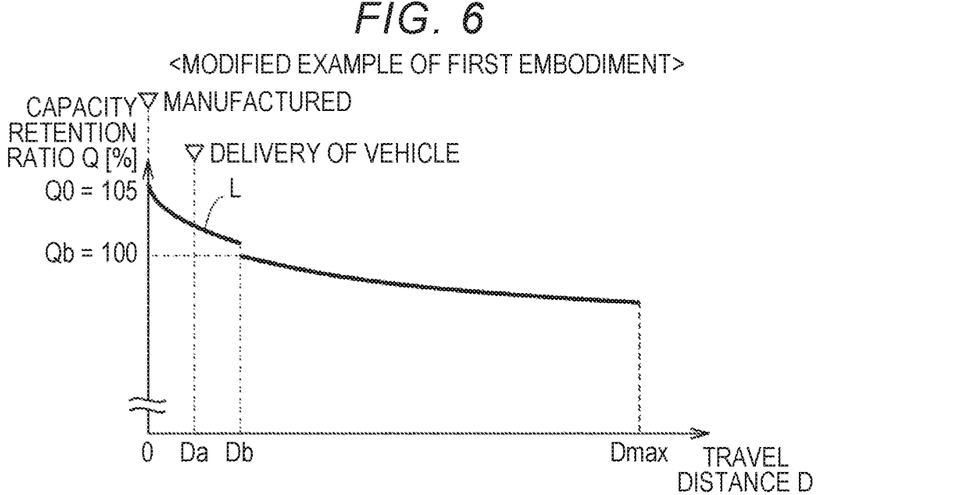
FIG. 6 is a diagram illustrating an example in which a capacity retention ratio of a battery is displayed according to a modified example of the first embodiment.

FIG. 4 is a diagram illustrating an example in which the capacity retention ratio of the battery 60 is displayed according to a first embodiment. In FIG. 4 and FIG. 6 which will be described later, the horizontal axis represents a travel distance D (a total travel distance) after the vehicle 1 has been manufactured. The vertical axis represents the capacity retention ratio Q of the battery 60. A bold line in the drawings indicates a change of the capacity retention ratio Q which is displayed on the instrument panel 80.

As illustrated in FIG. 4, regarding a travel distance D of the vehicle 1, a travel distance serving as a reference (hereinafter referred to as a "reference distance") Db is determined in advance. In general, until a vehicle is delivered to a user, a distance based on movement of the vehicle in a factory and movement at the time of travel test or transportation and the like is measured as a travel distance of the vehicle by an odometer (not illustrated). Accordingly, in many cases, a travel distance of a vehicle is not 0 km at the time of delivery to a user but is about several km or 100 km. The reference distance Db is a distance which is longer than a distance (several km or 100 km) in which the vehicle 1 is assumed to travel until the vehicle 1 is delivered to a user and is, for example, 100 km or longer.

In the first embodiment, the capacity retention ratio Q of the battery 60 which is displayed on the instrument panel 80 of the vehicle 1 is 100% until the travel distance D of the vehicle 1 reaches the reference distance Db. After the travel distance D has reached the reference distance Db, the capacity retention ratio Q of the battery 60 decreases to be less than 100% as the travel distance D increases.

Since the capacity retention ratio Q of the battery 60 at a time point (time ta) at which the vehicle 1 has been delivered to a user is 100% by performing display on the instrument panel as illustrated in FIG. 4, it is possible to decrease a sense of incompatibility which is felt by a user.

In the first embodiment, when the travel distance D has reached the reference distance Db, it may be considered that a "predetermined condition" according to the present disclosure has been satisfied. The capacity retention ratio Q=100% may be considered to be a "maximum value of an index" according to the present disclosure. When the number of icons corresponding to the capacity retention ratio of the battery 60 is displayed as the "index" according to the present disclosure, the maximum number of icons displayed (10 in the example illustrated in FIG. 2) may be considered to be a "maximum value of the index." When an EV travelable distance of the vehicle 1 is used as the "index" according to the present disclosure, the EV travelable distance at the time of manufacturing the vehicle 1 (which may be a measured value at the time of manufacturing the vehicle 1 or may be a catalog value) may be considered to be a "maximum value of the index."

<Flow of Deterioration Displaying Process>

Figure 5:
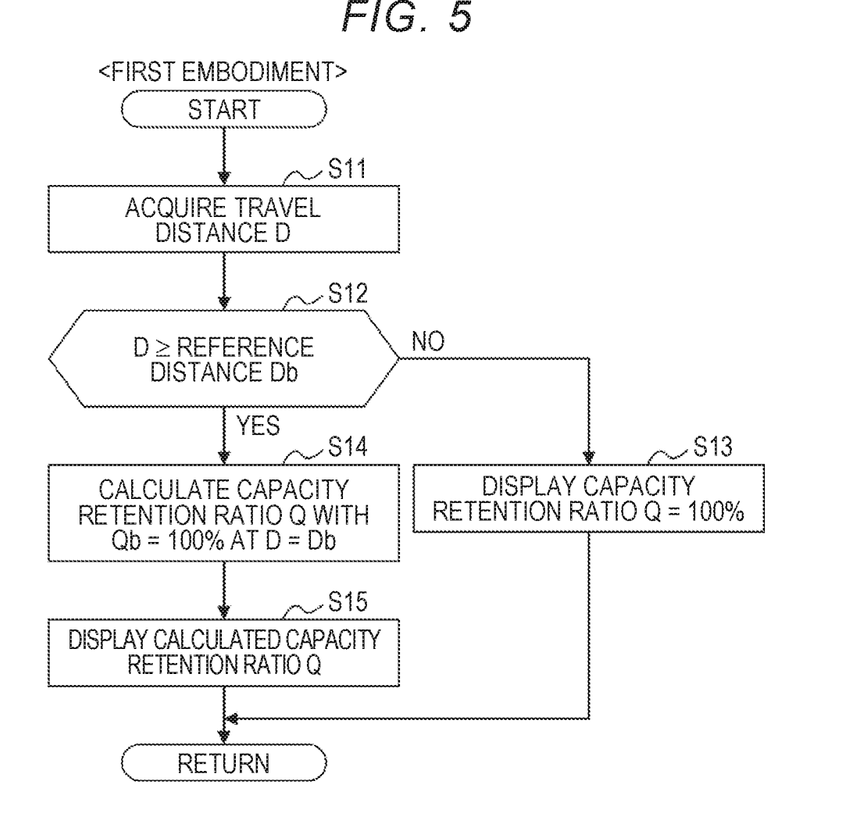
FIG. 5 is a flowchart illustrating a deterioration displaying process according to the first embodiment.

FIG. 5 is a flowchart illustrating a deterioration displaying process according to the first embodiment. The flowcharts illustrated in FIG. 5 and FIG. 8 which will be described later are repeatedly performed by the ECU 100, for example, whenever a predetermined period passes. The steps (hereinafter, a step is abbreviated to "S") included in the flowcharts are basically embodied by a software process in the ECU 100, but may be embodied by dedicated hardware (an electric circuit) which is incorporated into the ECU 100.

Referring to FIG. 5, in S11, the ECU 100 acquires a travel distance D of the vehicle 1 from an odometer (not illustrated) of the vehicle 1.

In S12, the ECU 100 determines whether the travel distance D acquired in S11 is equal to or greater than the reference distance Db. As described above, the reference distance Db is determined in advance to be longer (for example, 100 km) than a distance over which the vehicle 1 may travel until the vehicle 1 is delivered to a user and is stored in the memory of the ECU 100.

When the travel distance D is less than the reference distance Db (NO in S12), the ECU 100 controls the instrument panel 80 such that the capacity retention ratio Q of the battery 60 is displayed to be equal to 100% in S13. In the example illustrated in FIG. 2, a user is notified that the battery 60 has not deteriorated at all by displaying 10 icons. Alternatively, the ECU 100 may display a numerical value of "100%" as the capacity retention ratio Q of the battery 60 on the instrument panel 80.

On the other hand, when the travel distance D becomes equal to or greater than the reference distance Db (YES in S13), the ECU 100 sets the full charging capacity at a time point at which the travel distance D has reached the reference distance Db to 100% and calculates the later capacity retention ratio of the battery 60 in S14. Then, the ECU 100 displays the capacity retention ratio Q calculated in S14 on the instrument panel 80 (S15). In the example illustrated in FIG. 2, the ECU 100 controls display of the instrument panel 80 such that the number of icons decreases from 10 as the capacity retention ratio Q of the battery 60 decreases. Alternatively, the ECU 100 may display a numerical value less than 100% which is calculated as the capacity retention ratio Q of the battery 60 on the instrument panel 80.

The capacity retention ratio Q of the battery 60 can be calculated by a known method. More specifically, a state of charge (SOC) of the battery 60 is estimated two times and a charged/discharged power $\Delta Ah$ which is charged in or discharged from the battery 60 between the two estimations of the SOC is measured by current integration using a current sensor. In this case, the ECU 100 can calculate a full charging capacity C of the battery 60 using Equation (1) based on the estimation results S1 and S2 of the two estimations of the SOC and the charged/discharged power $\Delta Ah$.

$$C = \Delta Ah/(S1-S2) \times 100 \tag{1}$$

The capacity retention ratio Q of the battery 60 is calculated by dividing the full charging capacity C calculated using Equation (1) by an initial value C0 of the full charging capacity (for example, a value at a time point at which the travel distance D reaches the reference distance Db) of the battery 60 (see Equation (2)).

$$Q = C/C0 \times 100 \tag{2}$$

Instead of the full charging capacity at the time point at which the travel distance D has reached the reference distance Db, a full charging capacity (a catalog value) of the battery 60 at the time of manufacturing the vehicle 1 (or the battery 60) may be used as the initial value C0 of the full charging capacity.

In the flowchart illustrated in FIG. 5, an example in which the ECU 100 of the vehicle 1 calculates the capacity retention ratio Q of the battery 60 is described, but the capacity retention ratio Q of the battery 60 may be calculated by a server (not illustrated) which is provided outside the vehicle 1. The ECU 100 of the vehicle 1 appropriately transmits parameters (various parameters included in Equations (1) and (2)) for calculating the capacity retention ratio Q of the battery 60 to the server via the communication unit 90 and receives a result of calculation of the capacity retention ratio Q from the server. Accordingly, the ECU 100 can display the capacity retention ratio Q on the instrument panel 80.

As described above, in the first embodiment, the capacity retention ratio Q of the battery 60 which is displayed on the instrument panel 80 of the vehicle 1 is maintained at 100% until the travel distance D of the vehicle 1 reaches the reference distance Db. Accordingly, since a user to which the vehicle 1 has been delivered as a new vehicle does not see a capacity retention ratio Q less than 100%, it is possible to decrease (release) a sense of incompatibility of the user.

Until the travel distance D of the vehicle 1 reaches the reference distance Db after the vehicle 1 has been delivered to a user, the capacity retention ratio Q of the battery 60 is maintained at 100% and does not decrease. However, battery characteristics that a rate of progress of deterioration of a battery immediately after the battery has been manufactured is high are not likely to be known widely to typical users. Accordingly, when a capacity retention ratio does not change, it does not particularly give a sense of incompatibility to a user.

Modified Example of First Embodiment

In the first embodiment, the value which is maintained at 100% is displayed as the capacity retention ratio Q of the battery 60 on the instrument panel 80 until the travel distance D of the vehicle 1 reaches the reference distance Db. However, as will be described below, the capacity retention ratio Q does not need to be fixed to 100% until the travel distance D reaches the reference distance Db.

FIG. 6 is a diagram illustrating an example in which the capacity retention ratio Q of the battery 60 is displayed according to a modified example of the first embodiment. As illustrated in FIG. 6, the capacity retention ratio at the time of manufacturing of the vehicle 1 may be set to a prescribed value (105% in the example illustrated in FIG. 6) which is higher than 100%. Until the travel distance D of the vehicle 1 reaches the reference distance Db, control of the instrument panel 80 can be performed such that the capacity retention ratio Q decreases gradually from the prescribed value as the travel distance D increases.

In this way, in the modified example of the first embodiment, the capacity retention ratio Q of the battery 60 which is displayed on the instrument panel 80 of the vehicle 1 is also equal to or greater than 100% until the travel distance D of the vehicle 1 reaches the reference distance Db. Accordingly, since the capacity retention ratio Q of the battery 60 at the time of delivering the vehicle 1 is prevented from becoming less than 100%, it is possible to decrease a sense of incompatibility which is felt by a user similarly to the first embodiment.

In the modified example of the first embodiment, there is a likelihood that the capacity retention ratio Q will change discontinuously when the travel distance D has reached the reference distance Db as illustrated in FIG. 6. However, since the capacity retention ratio Q is equal to or greater than 100% in any case before and after changing, a sense of incompatibility which is felt by a user is considered not to be great. In the modified example of the first embodiment, the prescribed value (=105%) of the capacity retention ratio Q may be considered to be a "maximum value of the index" according to the present disclosure.

Second Embodiment

In the first embodiment (and the modified example thereof), an example in which the capacity retention ratio Q of the battery 60 is set to 100% (or equal to or greater than 100%) based on the travel distance D of the vehicle 1 has been described above. In a second embodiment, a configuration in which a reference for setting the capacity retention ratio Q of the battery 60 to 100% is set with a signal from the service tool 4 provided outside the vehicle 1 as a trigger will be described below. The configuration of the vehicle 1 in the second embodiment is the same as the configuration of the vehicle 1 in the first embodiment (see FIGS. 1 and 2) and thus description thereof will not be repeated.

Figure 7:
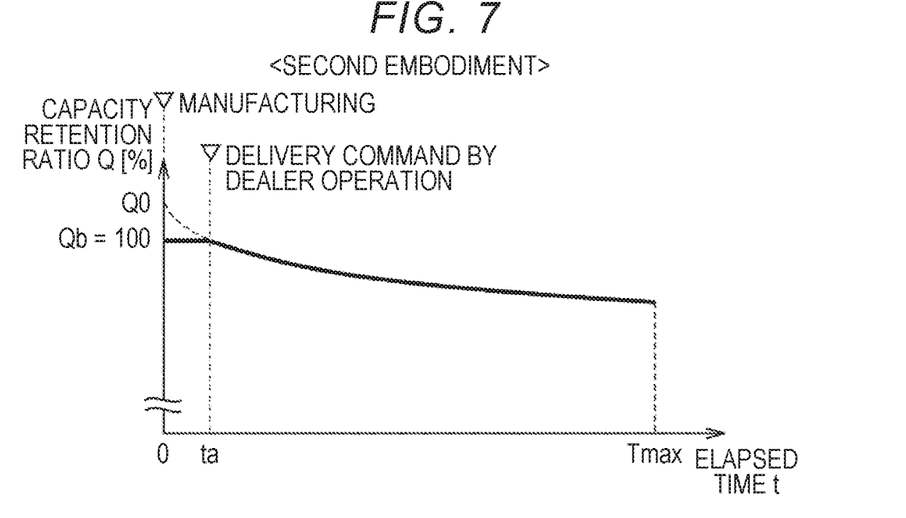
FIG. 7 is a diagram illustrating an example in which a capacity retention ratio of a battery is displayed according to a second embodiment.

FIG. 7 is a diagram illustrating an example in which the capacity retention ratio Q of the battery 60 is displayed according to the second embodiment. In FIG. 7, the horizontal axis represents an elapsed time t after the vehicle 1 has been manufactured. The vertical axis represents the capacity retention ratio Q of the battery 60.

When a user purchases the vehicle 1, first, it is necessary to perform a predetermined procedure for acquiring a certificate or a registration number of the vehicle 1 in an administrative organ (a police station or the District Land Transport Bureau taking charge of the user's location). The vehicle 1 shipped from a factory is subjected to an inspection operation (or an option mounting operation) or the like in a dealer shop and then is delivered to a user. An operator of the dealer shop connects the service tool 4 to the vehicle 1 (or may wirelessly communicate therewith) while such a procedure or operation is being performed and causes the service tool 4 to output a command (hereinafter also referred to as a "delivery command") indicating that it is near delivery of the vehicle 1 to the ECU 100 of the vehicle 1.

As illustrated in FIG. 7, in the second embodiment, the capacity retention ratio Q of the battery 60 which is displayed on the instrument panel 80 of the vehicle 1 is maintained at 100% until the ECU 100 receives a delivery command (see time ta). When a delivery command has been received at time ta, the capacity retention ratio Q of the battery 60 is displayed on to the instrument panel 80 such that the capacity retention ratio Q is less than 100% as time elapses (or as the travel distance D of the vehicle 1 increases).

In this way, with the configuration in which a trigger indicating delivery of the vehicle 1 is supplied to the ECU 100 from the outside of the vehicle 1, the capacity retention ratio Q of the battery 60 at the time point (time ta) at which the vehicle 1 has been delivered to a user can be 100% and can be prevented from becoming less than 100%. Accordingly, it is possible to decrease a sense of incompatibility which is felt by a user. In the second embodiment, when a delivery command has been supplied from the service tool 4 to the ECU 100, it may be considered that the "predetermined condition" according to the present disclosure has been satisfied.

Figure 8:
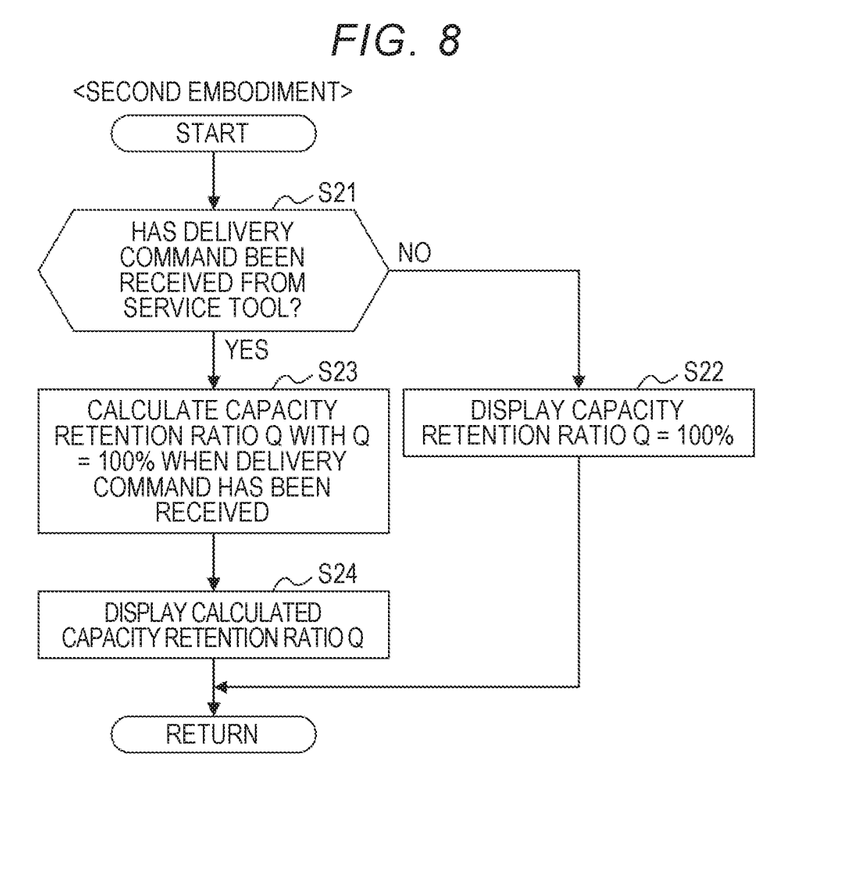
FIG. 8 is a flowchart illustrating a deterioration displaying process according to the second embodiment.

FIG. 8 is a flowchart illustrating a deterioration displaying process according to the second embodiment. Referring to FIG. 8, in S21, the ECU 100 determines whether a delivery command has been received from the service tool 4.

Until a delivery command has been received from the service tool 4 (NO in S21), the ECU 100 maintains the capacity retention ratio Q of the battery 60 which is displayed on the instrument panel 80 at 100% (S22). When a delivery command has been received from the service tool 4 (YES in S21), the ECU 100 sets the full charging capacity C at the time point at which the delivery command has been received to 100% and calculates the capacity retention ratio Q of the battery 60 thereafter (S23). Then, the ECU 100 displays the capacity retention ratio Q calculated in S23 on the instrument panel 80 (S24).

As described above, in the second embodiment, a period in which the capacity retention ratio Q of the battery 60 is maintained at 100% is set based on a delivery command which is supplied from the outside of the vehicle 1 instead of the travel distance D of the vehicle 1. Accordingly, similarly to the first embodiment, since the capacity retention ratio of the battery 60 is 100% at the time point at which the vehicle 1 has been delivered to a user, it is possible to decrease a sense of incompatibility which is felt by the user.

In the second embodiment, unlike the first embodiment, when the vehicle 1 has been delivered to a user, a decrease of the capacity retention ratio Q of the battery 60 starts quickly thereafter. Accordingly, even when the user knows battery characteristics that the rate of progress of deterioration of the battery immediately after the battery has been manufactured is high, the user is prevented from feeling a sense of incompatibility.

It has been described above that a delivery command is output from the service tool 4, that is, that a delivery command is supplied to the vehicle 1 from the outside of the vehicle 1, but the vehicle 1 itself may generate a delivery command. For example, a structure for outputting a delivery command (such as an operation button which is operated by a dealer) may be provided in the vehicle 1.

Although detailed description will not be repeated, the capacity retention ratio of the battery 60 until a delivery command is supplied may be set to a value greater than 100% in the second embodiment, similarly to the modified example of the first embodiment.

Modified Example of Second Embodiment

In the second embodiment, the capacity retention ratio Q is calculated from the full charging capacity of the battery 60 by the ECU 100 of the vehicle 1. In a modified example of the second embodiment, for example, the capacity retention ratio Q at the time point at which the vehicle 1 has been delivered is set to 100% by measuring a full charging capacity of the battery 60 using the service tool 4 in a dealer shop or the like at the time of delivery of the vehicle 1 and supplying the result of measurement to the vehicle 1.

Figure 9:
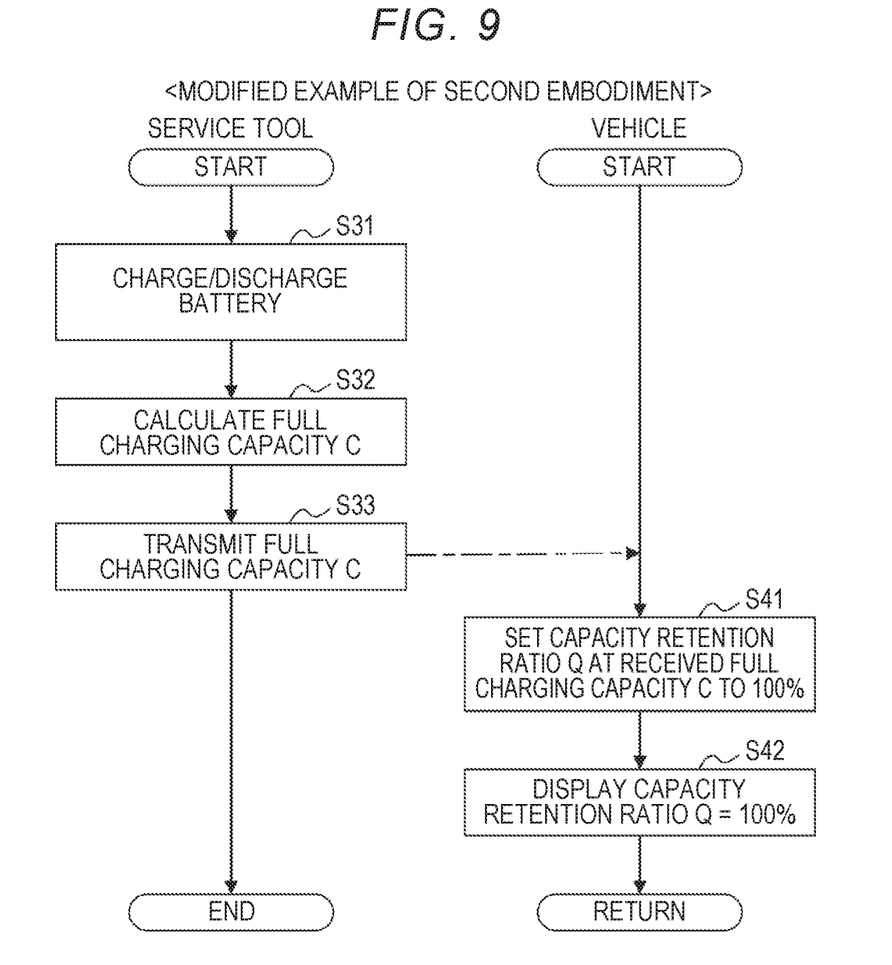
FIG. 9 is a flowchart illustrating a deterioration displaying process according to a modified example of the second embodiment.

FIG. 9 is a flowchart illustrating a deterioration displaying process according to a modified example of the second embodiment. In FIG. 9, a series of processes which are performed by the service tool 4 are illustrated in the left part of the drawing and a series of processes which are performed by the vehicle 1 (the ECU 100) are illustrated in the right part of the drawing. This flowchart is performed when an operator of a dealer shop has performed a predetermined operation on an operation unit (not illustrated) of the service tool 4 in a state in which the vehicle 1 and the charger 3 (or a load) are electrically connected to each other via the charging cable 2.

Referring to FIG. 9, in S31, the vehicle 1 charges/discharges (charging or discharging) the battery 60 by a predetermined power ΔAh in accordance with a command from the service tool 4. This power ΔAh is preferably set to a value as large as possible such as power until the battery 60 with a low SOC reaches a high SOC (a fully charged state).

In S32, the service tool 4 measures a full charging capacity of the battery 60. For example, the service tool 4 acquires the SOC of the battery 60 before charging/discharging starts in S31 (referred to as S1) and the SOC of the battery 60 after the charging/discharging ends (referred to as S2). The service tool 4 acquires the power ΔAh which has been charged/discharged by the battery 60 from the current sensor. Then, the ECU 100 calculates the full charging capacity C of the battery 60 using Equation (1).

In S33, the service tool 4 transmits the full charging capacity C measured in S32 to the vehicle 1.

In S41, the ECU 100 sets the capacity retention ratio Q of the battery 60 at the full charging capacity C received from the service tool 4 to 100%. Then, the ECU 100 displays the capacity retention ratio Q set to 100% on the instrument panel 80 (S42). Thereafter, although not illustrated in the drawing, the full charging capacity C of the battery 60 is calculated in the vehicle 1 as in a normal state and the capacity retention ratio Q is calculated from the result of calculation.

As described above, in the modified example of the second embodiment, the full charging capacity C of the battery 60 is measured by the service tool 4 in a dealer shop at the time of delivery of the vehicle 1. Since the capacity retention ratio Q at the time of delivery is prevented from becoming less than 100% by setting the capacity retention ratio Q at the measured full charging capacity C to 100%, it is possible to decrease a sense of incompatibility which is felt by a user similarly to the first and second embodiments.

As an example in which the "predetermined condition" according to the present disclosure is satisfied, an example in which the travel distance D of the vehicle 1 reaches the reference distance Db and an example in which a delivery command is supplied from the service tool 4 to the ECU 100 of the vehicle 1 have been described above. However, as a simpler configuration, the "predetermined condition" may be considered to have been satisfied when an elapsed time after the vehicle 1 has been manufactured reaches a predetermined period (for example, six months). For example, the elapsed time after the vehicle 1 has been manufactured may be a time which is measured by an onboard timer or may be a time which is measured by an external server (not illustrated) and transmitted to the vehicle 1.

The capacity retention ratio of the battery 60 and the EV travelable distance of the vehicle 1 are parameters indicating a larger value as deterioration of the battery 60 progresses less. On the other hand, an index indicating a smaller value as deterioration of the battery 60 progresses less may be used as an index for a user which is displayed on the instrument panel 80. As an example of such an index, a value obtained by subtracting the capacity retention ratio from 100% may be defined as a "deterioration level." In this case, the deterioration level at the time of delivery to a user is 0% which is a minimum value with respect to a maximum value 100% of the capacity retention ratio, and the deterioration level increases as the capacity retention ratio decreases thereafter. The deterioration level may be displayed using the instrument panel 80 shown in FIG. 2. For example, the number of icons in a state in which the battery 60 has deteriorated is 10 and the number of icons increases as deterioration of the battery 60 progresses. When the number of icons is equal to or less than eight, it means that deterioration of the battery 60 has progressed considerably and replacement of the battery 60 should be considered.

The embodiment disclosed herein is exemplary in all respects, but is not restrictive.

What is claimed is:
1. A vehicle comprising:
a secondary battery that is mounted as a power source in the vehicle; and
a display device configured to display, to a user of the vehicle, an index indicating a deterioration state of the secondary battery, wherein a value of the index decreases as deterioration of the secondary battery increases, and a maximum value of the index is displayed until a predetermined condition has been satisfied.

2. The vehicle according to claim 1, wherein the predetermined condition is satisfied when a total travel distance of the vehicle has reached a predetermined distance.

3. The vehicle according to claim 1, wherein the predetermined condition is satisfied when the vehicle is delivered to the user.

4. The vehicle according to claim 1, wherein the index is at least one of a capacity retention ratio of the secondary battery and a travelable distance over which the vehicle is able to travel with electric power stored in the secondary battery.

5. The vehicle according to claim 4, further comprising a control device configured to control the display device,
wherein the control device is configured to receive a full charging capacity of the secondary battery from a device provided outside the vehicle when the vehicle is delivered to the user and to set the capacity retention ratio of the secondary battery corresponding to the received full charging capacity to 100%.

6. A vehicle comprising:
a secondary battery that is mounted as a power source in the vehicle; and
a display device configured to display, to a user of the vehicle, an index indicating a deterioration state of the secondary battery, wherein a value of the index increases as deterioration of the secondary battery increases, and to display a minimum value of the index is displayed until a predetermined condition has been satisfied.

7. The vehicle according to claim 6, wherein the predetermined condition is satisfied when a total travel distance of the vehicle has reached a predetermined distance.

8. The vehicle according to claim 6, wherein the predetermined condition is satisfied when the vehicle is delivered to the user.

9. A method of controlling a vehicle in which a secondary battery is mounted as a power source, the method comprising:
determining whether a predetermined condition has been satisfied; and
causing a display device to display, to a user of the vehicle, an index indicating a deterioration state of the secondary battery, wherein a value of the index decreases as deterioration of the secondary battery increases, and a maximum value of the index is displayed until the predetermined condition has been satisfied.

* * * * *